(12) United States Patent
Hartel

(10) Patent No.: US 6,748,711 B2
(45) Date of Patent: Jun. 15, 2004

(54) DOOR FOR A HOUSING CONTAINING ELECTRICAL COMPONENTS

(75) Inventor: Marc Hartel, Reiskirchen (DE)

(73) Assignee: Rittal GmbH & Co. KG, Herborn (DE)

(*) Notice: Subject to any disclaimer, the term of this patent is extended or adjusted under 35 U.S.C. 154(b) by 0 days.

(21) Appl. No.: 09/965,130

(22) Filed: Sep. 26, 2001

(65) Prior Publication Data

US 2002/0073624 A1 Jun. 20, 2002

(30) Foreign Application Priority Data

Sep. 27, 2000 (DE) ......................................... 100 47 774

(51) Int. Cl.[7] ................................................ E06B 3/70
(52) U.S. Cl. ............................ 52/456; 52/455; 52/465; 52/783.12; 52/800.13
(58) Field of Search ............................... 52/456, 783.12, 52/455, 465, 800.13, 800.17

(56) References Cited

U.S. PATENT DOCUMENTS

| | | | |
|---|---|---|---|
| 5,634,998 A | * | 6/1997 | Schiedegger et al. .......... 52/456 |
| 5,704,182 A | * | 1/1998 | Schiedegger et al. .......... 52/456 |
| 5,743,057 A | * | 4/1998 | Martin ......................... 52/457 |
| 5,946,873 A | * | 9/1999 | Schiedegger et al. .......... 52/457 |
| 6,311,454 B1 | * | 11/2001 | Kempel ................... 52/784.15 |
| 6,453,638 B2 | * | 9/2002 | Chen ....................... 52/784.15 |
| 6,502,357 B1 | * | 1/2003 | Stuthman et al. ............. 52/241 |

FOREIGN PATENT DOCUMENTS

DE    42 42 589    6/1993

OTHER PUBLICATIONS

GB publication 2 258 683 A Feb. 17, 1993 Wu Chang Hseih*

* cited by examiner

Primary Examiner—Carl D. Friedman
Assistant Examiner—Nahid Amiri
(74) Attorney, Agent, or Firm—Pauley Petersen & Erickson

(57) ABSTRACT

A door for a housing containing electrical components, in particular a switchgear cabinet, having a door frame, which has two vertical profiled frame sections spaced parallel apart from each other and connected at their longitudinal ends by horizontal transverse stays. Vertical and/or horizontal profiled cover elements are applied on an outside of the door to the vertical profiled frame sections and/or the transverse stays. The vertical profiled frame sections have receivers into which at least one cover panel can be inserted, which at least partially covers a door panel area surrounded by the door frame. To be able to equip the door panel area modularly, the receivers of the vertical profiled frame sections are formed as grooves in which edges of the sheathing panels are held. On their longitudinal sides the transverse stays have shoulders, each of which supports at least one plug-in shoulder. The plug-in shoulders are fixed in plug-in receivers of the vertical profiled frame sections.

17 Claims, 4 Drawing Sheets

DOOR FOR A HOUSING CONTAINING ELECTRICAL COMPONENTS

BACKGROUND OF THE INVENTION

1. Field of the Invention

This invention relates to a door for a housing containing electrical components, in particular a switchgear cabinet, having a door frame, which has two vertical profiled frame sections spaced parallel apart from each other and connected at their longitudinal ends by horizontal transverse stays, wherein vertical and/or horizontal profiled cover elements are applied on the outside of the door to the vertical profiled frame sections and/or the transverse stays, and the vertical profiled frame sections have receivers into which at least one cover panel can be inserted, which at least partially covers the door panel area surrounded by the door frame.

2. Description of Related Art

A door is known from German Patent Reference DE 42 42 589 A1. A door frame is assembled from four profiled frame sections of identical cross section. On their longitudinal ends, the profiled frame sections are bevel-cut and positioned together. Corner connectors are used for connecting the profiled frame sections and are inserted with plug-in shoulders into hollow chamber receptacles in the profiled frame sections. The front of the assembled door frame can be covered with profiled cover elements. Together with the profiled frame sections of the door frame, the profiled cover elements form clamping receivers, in which a sheathing panel is held. The sheathing panel then covers the door panel area enclosed by the door frame.

SUMMARY OF THE INVENTION

It is one object of this invention to provide a door of the type mentioned above but which permits a modular design of the door panel area, and at the same time simple mounting.

This object is achieved with receivers of the vertical profiled frame sections that are embodied in the form of grooves, in which the edges of the sheathing panels are held. On their longitudinal sides the transverse stays have shoulders, each of which supports at least one plug-in shoulder. The plug-in shoulders are fixed in plug-in receivers of the vertical profiled frame sections.

One or several sheathing panels can be inserted into the grooves of the vertical profiled frame section. If several sheathing panels are employed, they are staggered behind each other in the longitudinal groove direction. It is thus possible to construct the door panel area in accordance with the design and functional requirements of the user. But the construction of the door remains simple. The transverse stays already have the required connecting elements for connection to the vertical profiled frame sections. Thus it is possible to eliminate elaborate additional connectors.

In accordance with a preferred embodiment of this invention, the extension of the receiving area of the sheathing panels running in the longitudinal direction of the vertical profiled frame sections corresponds to a whole number multiple of a modular extension. The sheathing panels have a dimension extending in the longitudinal direction of the vertical profiled frame sections which corresponds to a whole number multiple of the modular extension. Thus the receiving area can be completely filled with standardized sheathing panels, similar to a building block system. The sheathing panels can have uniform dimensions in the longitudinal direction of the vertical profiled frame sections.

The sheathing panels can also be included in the air conditioning processes of the housing and can either be embodied with perforations or as closed cover elements. A heat exchange with the adjacent area is possible through the perforations.

In another embodiment of this invention, the transverse stays have a plug-in plate which is arranged between the vertical profiled frame sections and has edges inserted into the grooves of the vertical profiled frame sections. The plug-in plates have horizontal edges, which are located opposite the horizontal edges of each sheathing panel inserted at the end of the door panel area. The plug-in plates close off the receiving area for the sheathing panels and thus maintain them in grooves. The plug-in plates also provide an addition to the torsional rigidity of the door. For example, simple mounting of the profiled cover elements is possible if the vertical profiled frame sections have a support surface into which at least one fastening groove extending in the longitudinal profile direction is cut. The vertical profiled cover elements have detent strips, which are locked in the fastening grooves.

The functionality of the door can be expanded if at least one of the horizontal transverse stays supports a horizontal profiled cover element which has a receptacle, and an indicator element is inserted into the receptacle.

In the process, the indicator element is designed as a display and the horizontal profiled cover element has a cable passage, which is arranged flush with a cable passage in the transverse stay. Thus the triggering of the display can occur from the interior of the housing.

In order to be able to arrange the front of the vertical profiled frame sections hidden from view, in one embodiment of this invention, the transverse stays have face elements which cover the front ends of the vertical profiled frame sections.

The vertical profiled frame sections can be embodied as extruded profiled elements, into which the grooves are formed in one piece.

BRIEF DESCRIPTION OF THE DRAWINGS

This invention is explained in greater detail in view of embodiments shown in the drawings, wherein.

DESCRIPTION OF PREFERRED EMBODIMENTS

Figure 1:
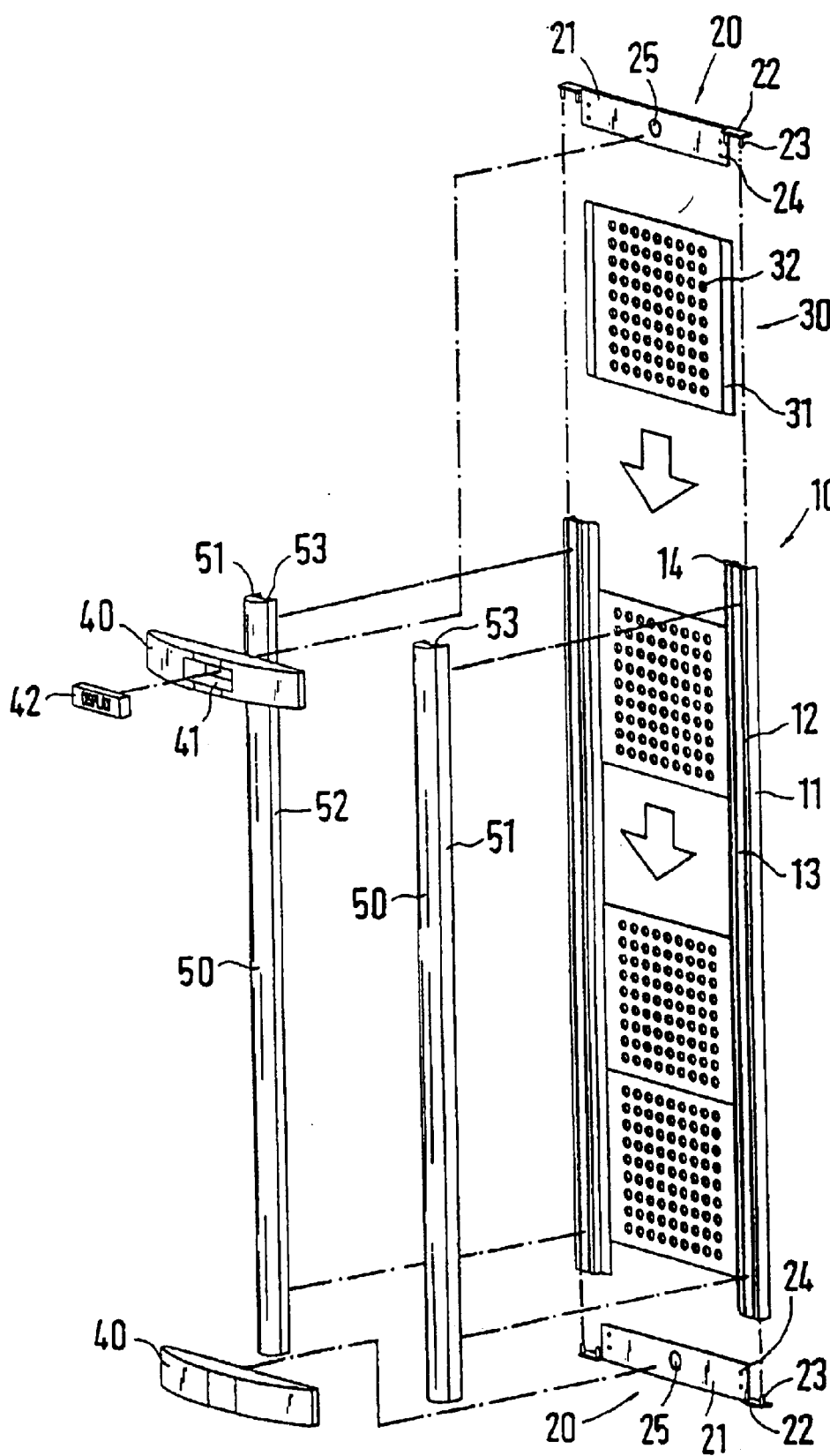
FIG. 1 shows a door in a perspective exploded view.

A door, which has a door frame 10, is shown in FIG. 1. The door frame 10 is assembled from two vertical profiled frame sections 11 and two horizontal transverse stays 20. The vertical profiled frame sections 11 are embodied as extruded profiled elements and have a groove 14 extending in the longitudinal direction. The vertical profiled frame sections 11 have a support surface 13 at the front, into which two fastening grooves 12 are cut. The vertical profiled frame sections 11 can be connected with each other by means of the transverse stays 20. The transverse stays 20 are produced as stamped and bent components from a sheet metal blank and have a vertical plug-in plate 21, which respectively has a circular opening 25. Respectively, two screw receptacles 24 are provided in an area of the narrow sides of the plug-in plate 21. Shoulders 22 are formed on the longitudinal ends of the transverse stay 20. The shoulders 22 respectively support two plug-in shoulders 23. The plug-in shoulders 23 can be inserted into and fastened within corresponding plug-in receivers of the vertical profiled frame sections 11. The plug-in shoulders 23 can be maintained clamped to the vertical profiled frame sections 11. The fastening receivers are preferably embodied as channel-like receptacle chambers, formed in one piece with the vertical profiled frame section 11.

Figure 2:
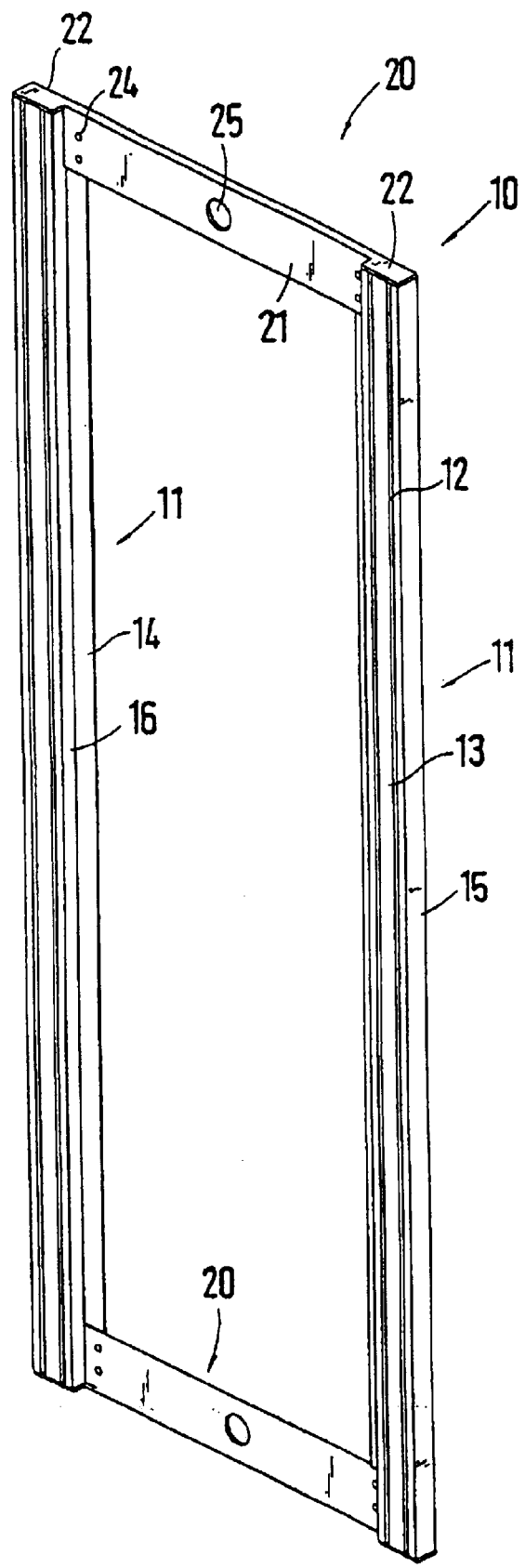
FIG. 2 shows a door frame of the door as shown in FIG. 1, in a perspective view.

The door frame 10 shown in FIG. 2 can be constructed by means of the two transverse stays 20. As shown, the door frame surrounds a door panel area which can be filled with sheathing panels 30.

Figure 3:
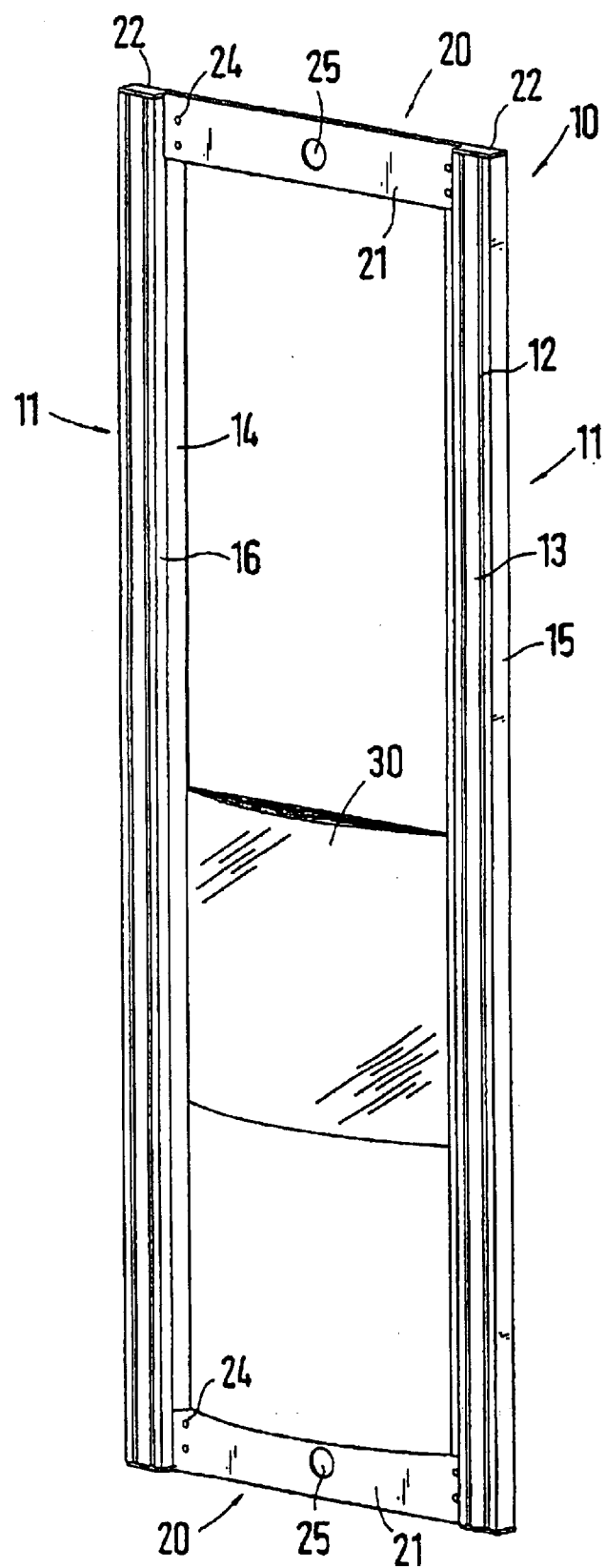
FIG. 3 shows the door frame shown in FIG. 2, in a perspective view.
Figure 4:
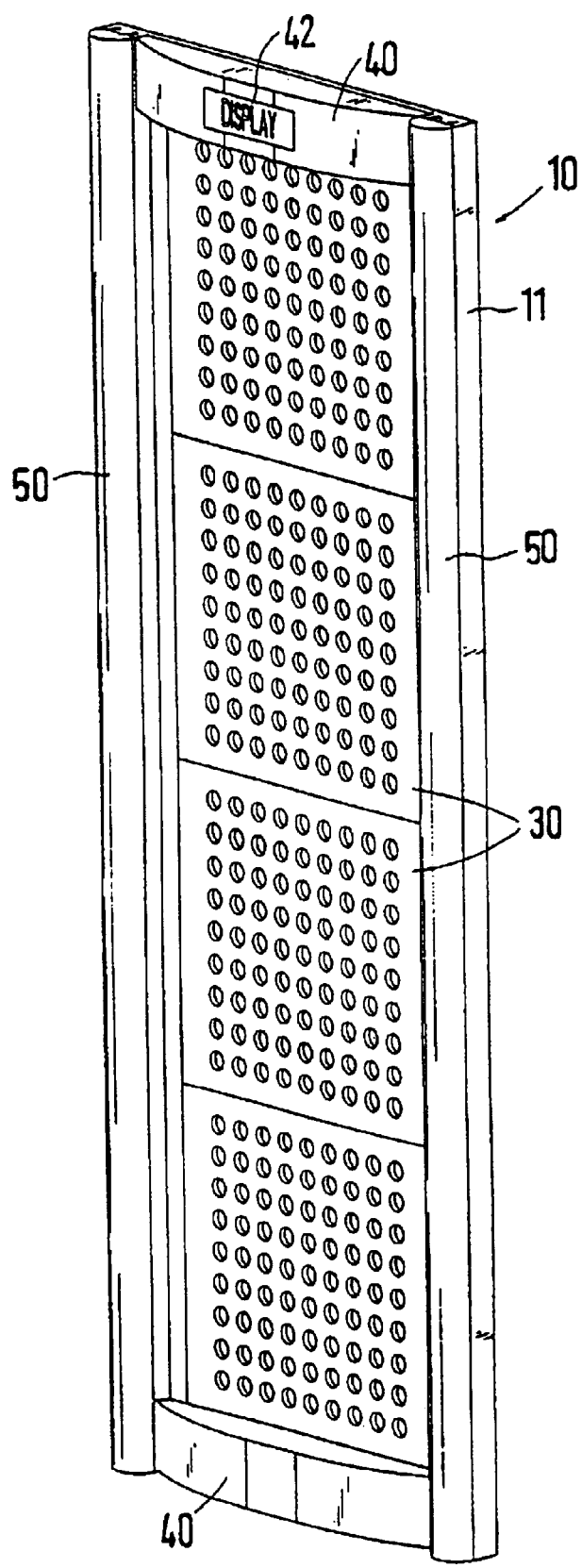
FIG. 4 shows the door shown in FIG. 1 but in an assembled view.

As shown in FIG. 1, the edges 31 of the sheathing panels 30 can be inserted into the grooves 14 of the vertical profiled frame sections 11. The sheathing panels 30 in FIG. 1 have perforations 32. However, it is also possible to employ sheathing panels with a closed front, as illustrated by way of example in FIG. 3. There, a glass pane is used as the sheathing panel 30. The sheathing panels 30 respectively extend over a quarter of the height of the door panel area. It is possible to push four sheathing plates 30, placed above each other, into the grooves 14. With this arrangement a modular construction in particular is possible. Accordingly, sheathing panels with perforations 32 and with a closed surface can be combined with each other. It is also possible to employ sheathing panels with advertising and the like. For assembling the door, first a transverse stay 20 is connected with the two vertical profiled frame sections 11. In the process the plug-in plate 21 engages the grooves 14 with its edges which are assigned to the vertical profiled frame section 11. Thus the grooves 14 are closed. Subsequently, the sheathing panels 30 can be inserted into the grooves 14, wherein the lowest sheathing panel 30 contacts the plug-in plate 21 of the lower assembled transverse stay 20. When the door panel area is lined with the sheathing panels 30, the upper transverse stay 20 can be mounted. During this the plug-in plate 21 again engages the grooves 14 and thus prevents the sheathing plates 30 from falling out.

As shown in FIG. 1, the door frame 10 can be covered by means of horizontal and vertical profiled cover elements 40 and 50 placed on its front. There the horizontal profiled cover elements 40 are placed on the plug-in plates 21 of the transverse stays 20. A secure fixation in place of the horizontal profiled cover elements 40 can be assured with fastening screws, which pass through the screw receptacles 24 of the plug-in plates 21 and are screwed into appropriate screw receptacles 24 of the horizontal profiled cover elements 40. The fastening screws are only accessible from the back of the door, so that manipulation access is impossible. The upper transverse stay 20 has a receptacle 41, into which an indicator element 42, in this case a display, can be inserted. It is also possible for an advertising device to be installed in the receptacle 41. The display can be operated by means of supply lines which are conducted through the opening 25 in the transverse stay 20 to the back of the door and can be wired up in the interior of the switchgear cabinet.

On backs facing the vertical profiled frame section 11, the vertical profiled frame sections 50 have two detent strips 53. The detent strips 53 are locked in the fastening grooves 12 of the vertical profiled frame sections 11. The longitudinal sides 15 and 16 of the vertical profiled frame sections 11 are covered by cover strips 51 and 52, which are formed in one piece on the vertical profiled cover elements 50.

What is claimed is:

1. A switchgear cabinet containing electrical components with a door frame (10) with two vertical profiled frame sections (11) spaced parallel apart from each other and connected at longitudinal ends by horizontal transverse stays (20), wherein separate vertical profiled cover elements (50) and separate horizontal profiled cover elements (40) are applied on an outside surface of the door frame (10) to the vertical profiled frame sections and the horizontal transverse stays, and wherein the vertical profiled frame sections (11) have receivers into which at least one sheathing panel (30) can be inserted, which at least partially covers a door panel area surrounded by the door frame (10), the improvement comprising:

on a back surface of the separate vertical profiled cover elements (50) having two detent strips (53) which attach the separate vertical profiled cover elements to the vertical profiled frame sections (11);

on a support surface (13) of the vertical profiled frame sections (11) at least one fastening groove (12) for receiving the detent strips (53) of the separate vertical profiled cover elements (50);

the receivers of the vertical profiled frame sections (11) embodied in a form of grooves (14) in which edges (31) of the at least one sheathing panel (30) are held;

on longitudinal sides the transverse stays (20) having shoulders (22) which each support at least one plug-in shoulder (23); and the plug-in shoulders (23) fixed in plug-in receivers of the vertical profiled frame sections (11).

2. In the switchgear cabinet in accordance with claim 1, wherein an extension of a receiving area of the at least one sheathing panel (30) running in a longitudinal direction of the vertical profiled frame sections (11) corresponds to a whole number multiple of a modular extension, and the at least one sheathing panel (30) has a dimension extending in the longitudinal direction of the vertical profiled frame sections (11) which corresponds to the whole number multiple of the modular extension.

3. In the switchgear cabinet in accordance with claim 2, wherein the at least one sheathing panel (30) has uniform dimensions in the longitudinal direction of the vertical profiled frame sections (11).

4. In the switchgear cabinet in accordance with claim 3, wherein the at least one sheathing panel (30) has perforations (32) in a visible surface to provide a heat exchange with an adjacent area through the perforations.

5. In the switchgear cabinet in accordance with claim 4, wherein the transverse stays (20) have a plug-in plate (21) arranged between the vertical profiled frame sections (11) with plate edges that are inserted into grooves (14) of the vertical profiled frame sections (11), and the plug-in plates (21) have plate horizontal edges located opposite panel horizontal edges of the at least one sheathing panel inserted at the end of the door panel area.

6. In the switchgear cabinet in accordance with claim 5, wherein the vertical profiled frame sections (11) have a front support surface (13) into which at least one fastening groove (12) extending in the longitudinal direction is cut, and the vertical profiled cover elements (50) have detent strips (53) locked in the fastening grooves (12).

7. In the switchgear cabinet in accordance with claim 6, wherein at least one of the horizontal transverse stays (20) supports a horizontal profiled cover element (40) which has a receptacle (41), and an indicator element (42) is inserted into the receptacle (41).

8. In the switchgear cabinet in accordance with claim 7, wherein the indicator element (42) is designed as a display, and the horizontal profiled cover element (40) has a cable passage arranged flush with a cable passage (25) in the transverse stay (20).

9. In the switchgear cabinet in accordance with claim 8, wherein the transverse stays (20) have face elements which cover front ends of the vertical profiled frame sections (11).

10. In the switchgear cabinet in accordance with claim 9, wherein the vertical profiled frame sections (11) are extruded profiled elements.

11. In the switchgear cabinet in accordance with claim 1, wherein the at least one sheathing panel (30) has perforations (32) in a visible surface to provide a heat exchange with an adjacent area through the perforations.

12. In the switchgear cabinet in accordance with claim 1, wherein the transverse stays (20) have a plug-in plate (21) arranged between the vertical profiled frame sections (11) with plate edges that are inserted into grooves (14) of the vertical profiled frame sections (11), and the plug-in plates (21) have plate horizontal edges located opposite panel horizontal edges of the at least one sheathing panel inserted at the end of the door panel area.

13. In a door for a housing containing electrical components, such as a switchgear cabinet, having a door frame (10) with two vertical profiled frame sections (11) spaced parallel apart from each other and connected at longitudinal ends by horizontal transverse stays (20), wherein at least one of a vertical profiled cover element and a horizontal profiled cover element is applied to an outside surface of the door frame (10) to at least one of the vertical profiled frame sections and the transverse stays, and wherein the vertical profiled frame sections (11) have receivers into which at least one sheathing panel (30) can be inserted, which at least partially covers a door panel area surrounded by the door frame (10), the improvement comprising:

the receivers of the vertical profiled frame sections (11) embodied in a form of grooves (14) in which edges (31) of the at least one sheathing panel (30) are held;

on longitudinal sides of the transverse stays (20) having shoulders (22) which each supports at least one plug-in shoulders (23);

the plug-in shoulders (23) fixed in plug-in receivers of the vertical profiled frame sections (11);

the vertical profiled frame sections (11) having a front support surface (13) into which at least one fastening groove (12) extending in the longitudinal direction is cut; and the vertical profiled cover elements (50) having detent strips (53) locked in the fastening grooves (12).

14. In a door for a housing containing electrical components, such as a switchgear cabinet, having a door frame (10) with two vertical profiled frame sections (11) spaced parallel apart from each other and connected at longitudinal ends by horizontal transverse stays (20), wherein at least one of a vertical profiled cover element and a horizontal profiled cover element is applied on an outside of the door to at least one of the vertical profiled frame sections and the transverse stays, and wherein the vertical profiled frame sections (11) have receivers into which at least one sheathing panel (30) can be inserted, which at least partially covers a door panel area surrounded by the door frame (10), the improvement comprising:

the receivers of the vertical profiled frame sections (11) embodied in a form of grooves (14) in which edges (31) of the at least one sheathing panel (30) are held;

on longitudinal sides the transverse stays (20) having shoulders (22) which each supports at least one plug-in shoulder (23); and the plug-in shoulders (23) fixed in plug-in receivers of the vertical profiled frame sections (11);

wherein at least one of the horizontal transverse stays (20) supports a horizontal profiled cover element (40) which has a receptacle (41), and an indicator element (42) is inserted into the receptacle (41).

15. In the door in accordance with claim 14, wherein the indicator element (42) is designed as a display, and the horizontal profiled cover element (40) has a cable passage arranged flush with a cable passage (25) in the transverse stay (20).

16. In the switchgear cabinet in accordance with claim 1, wherein the transverse stays (20) have face elements which cover front ends of the vertical profiled frame sections (11).

17. In the switchgear cabinet in accordance with claim 1, wherein the vertical profiled frame sections (11) are extruded profiled elements.

* * * * *